(No Model.)
E. C. WILEY.
HILLSIDE CULTIVATOR.
No. 383,607. Patented May 29, 1888.
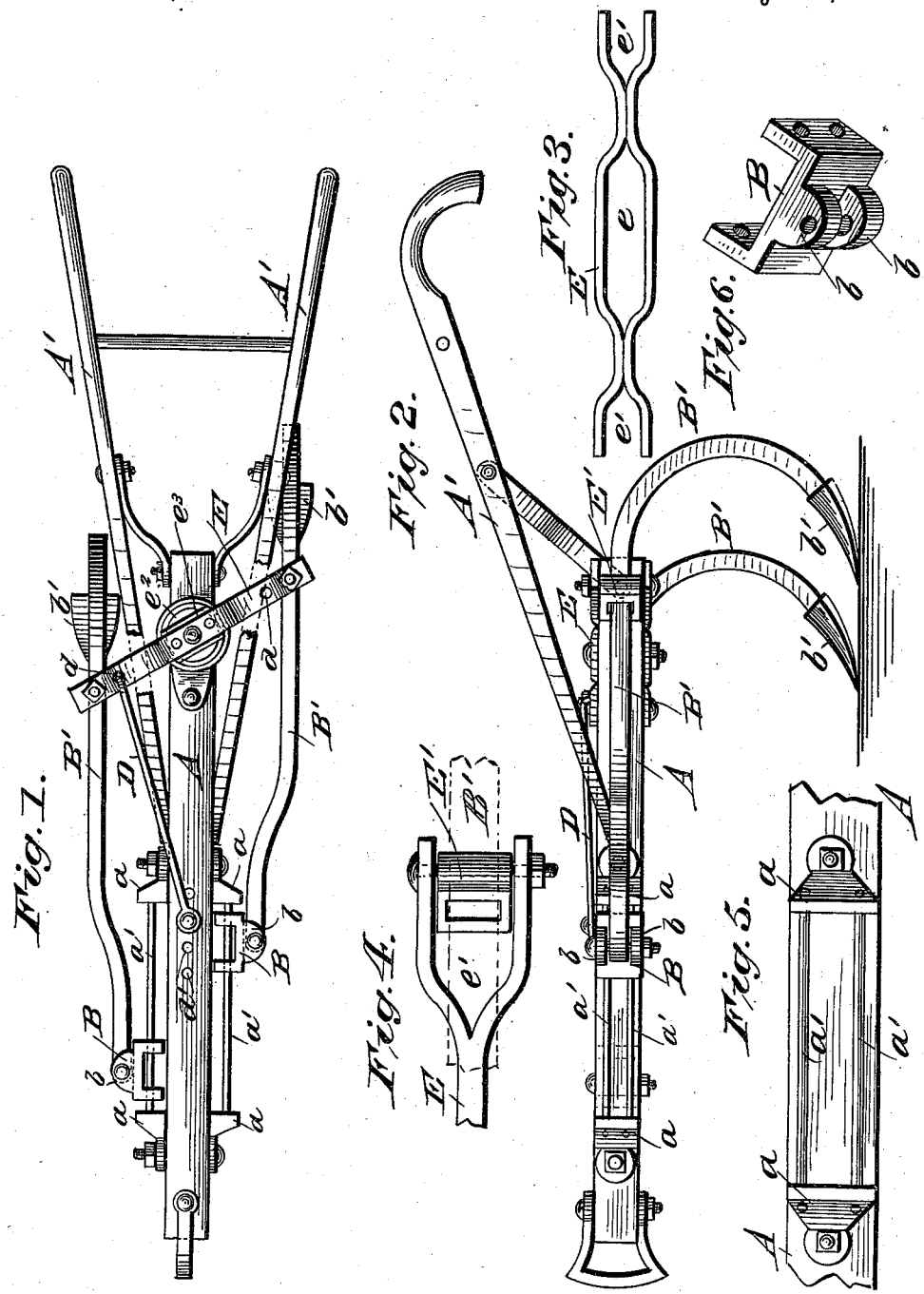
WITNESSES:
Phil C. Dietrich.
E. M. Clark.
INVENTOR:
E. C. Wiley
BY Munn & Co.
ATTORNEYS.

UNITED STATES PATENT OFFICE.

EDGAR C. WILEY, OF INDEPENDENCE, VIRGINIA.

HILLSIDE-CULTIVATOR.

SPECIFICATION forming part of Letters Patent No. 383,607, dated May 29, 1888.

Application filed March 1, 1888. Serial No. 265,791. (No model.)

*To all whom it may concern:*

Be it known that I, EDGAR C. WILEY, of Independence, in the county of Grayson and State of Virginia, have invented a new and Improved Hillside-Cultivator, of which the following is a full, clear, and exact description.

My invention relates to an adjustable hillside-cultivator, and has for its object to provide a means whereby the plow-shanks can be adjusted to throw one share in front and the other to the rear, and vice versa.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in all the views.

Figure 1 is a plan view of the cultivator. Fig. 2 is a side elevation. Fig. 3 is a side elevation of the shifting-bar, and Figs. 4, 5, and 6 are detail views.

It is necessary in plowing corn or plowing in grain on a hillside to keep the front plow on the lower side, in order that the second plow will fill the furrow of the first, to accomplish which result is the prime object of the present invention. To that end upon the plow-beam A, which is provided with the usual handles, A', spaced brackets $a$ are secured upon opposite sides near the front, the respective brackets upon each side being connected by spaced rods $a'$, removed from and parallel with the beam.

An essentially U-shaped block, B, is adapted to slide upon the rods $a'$, saids rods passing through suitable apertures in the members of the block. Upon the outer surface of said block, at top and bottom, aligning apertured lugs $b$ are formed, between which lugs the shank-arms B' of the shares $b'$ are respectively pivoted.

An adjusting or cross bar, E, is pivoted upon the beam near the rear, consisting of two strips of metal welded or otherwise attached, bent to form a central loop, $e$, and bifurcated ends $e'$.

In securing the adjusting-bar to the beam the latter is passed through the loop of the former. The bearing-surfaces of the beam adjacent to the bar E at top and bottom are protected by a plate, $e^2$, and the said bar resting in a cradle, $e^3$, is pivoted upon the beam by a pin passing through the same and the bar and carrier, as shown in Figs. 1 and 2. In the bifurcated ends of the adjusting-bar a slotted plate, E', is pivoted, and through the slot in said plate the shank-arms B' are passed, as shown in Figs. 2 and 4, curving rearward to the ground in the ordinary manner.

The adjusting-bar is provided with a series of apertures, $d$, and in the beam, at or about the center, a series of apertures, $d'$, is provided, in one of which latter apertures the forward or eye end of a hook, D, is pivoted, the other end of said hook being adapted to engage one of the apertures in the adjusting-bar.

When the plow is to be changed, the hook D is disengaged from the adjusting-bar, the operator inserting the front share in the ground. The horses are then started, and the rear plow not being in contact with the ground is brought forward by the power of the horse, while the other plow slides back. The hook is then inserted into the hole in the opposite end of the adjusting-bar, holding it in position. The shank-irons slide backward and forward freely at their front ends through the medium of the sliding blocks B, the rear ends being manipulated through the medium of the adjusting-bar, to which they are attached. The width the plows are apart can be regulated by the distance which they move, being widest apart when the adjusting-bar is at right angles to the beam, the space decreasing as it moves in either direction.

By adjusting the pivotal pin of the hook in the apertures of the beam the throw of the plows may be varied.

Having thus described my invention, I claim as new and desire to secure by Letters Patent—

1. In a hillside plow or cultivator, the combination, with a central beam, of side beams having a pivotal and sliding connection with the central beam at their forward ends, a bar pivoted at its center to the rear end of the central beam and having its ends connected to the side beams, and means for locking the said bar in position, substantially as described.

2. In a hillside-cultivator, the combination, with a central beam provided with rods on opposite sides near its forward end, of sliding blocks on said rods, side beams pivoted to said sliding blocks, a bar pivoted at its center to the rear end of the central beam and having its ends connected to the side beams, and means for locking the said bar in position, substantially as described.

3. In a hillside-cultivator, the combination, with a central beam and side beams having a pivotal and sliding connection with the central beam at their forward ends, of a bar pivoted at its center to the rear end of the central beam, plates pivoted to the ends of the bar and provided with slots, through which pass the side beams, and means for locking the said bar at different angles to the said central beam, substantially as herein shown and described.

4. In a hillside-cultivator, the combination, with a central beam and side beams having a pivotal and sliding connection at their forward ends with the central beam, of the bar E, having a central loop, $e$, and bifurcated ends $e'$, and pivoted to the rear end of the central beam, the plates E', pivoted between the bifurcations of the bar E and provided with slots, through which pass the side beams, and the hook D, adjustably pivoted to the central beam and engaging the bar E, substantially as herein shown and described.

EDGAR C. WILEY.

Witnesses:
A. L. LANCASTER,
GEO. W. MATUR.